(12) United States Patent
Chen

(10) Patent No.: US 11,630,689 B2
(45) Date of Patent: *Apr. 18, 2023

(54) IMAGE SUBUNIT BASED GUEST SCHEDULING

(71) Applicant: Red Hat, Inc., Raleigh, NC (US)

(72) Inventor: Huamin Chen, Westborough, MA (US)

(73) Assignee: Red Hat, Inc., Raleigh, NC (US)

(*) Notice: Subject to any disclaimer, the term of this patent is extended or adjusted under 35 U.S.C. 154(b) by 3 days.

This patent is subject to a terminal disclaimer.

(21) Appl. No.: 17/201,805

(22) Filed: Mar. 15, 2021

(65) Prior Publication Data

US 2021/0200577 A1    Jul. 1, 2021

Related U.S. Application Data

(63) Continuation of application No. 15/890,654, filed on Feb. 7, 2018, now Pat. No. 10,949,250.

(51) Int. Cl.
*G06F 9/48* (2006.01)
*G06F 9/455* (2018.01)
(Continued)

(52) U.S. Cl.
CPC .............. *G06F 9/4843* (2013.01); *G06F 8/63* (2013.01); *G06F 9/45545* (2013.01);
(Continued)

(58) Field of Classification Search
CPC ...... G06F 9/4843; G06F 8/63; G06F 9/45545; G06F 16/24573; G06F 9/45558;
(Continued)

(56) References Cited

U.S. PATENT DOCUMENTS 9,276,987 B1 *   3/2016   Sirota ................... G06F 9/5033
10,210,172 B1 *  2/2019   Konig .................... H04L 67/06
(Continued)

FOREIGN PATENT DOCUMENTS

CN    106506587    3/2017
CN    106506655    3/2017
WO    2016099346   6/2016

OTHER PUBLICATIONS

Containers and other new technologies in IT Operations, An Overview, by Raffaele Spazzoli, mokabyte; http://www.mokabyte.it/2015/11/containersitops/ pp. 1-11.
(Continued)

*Primary Examiner* — Jorge A Chu Joy-Davila
(74) *Attorney, Agent, or Firm* — K&L Gates LLP

(57) ABSTRACT

Image subunit based guest scheduling is disclosed. For example, a memory stores an image registry, which stores a plurality of reference entries each associated with subunits hosted on each node of a plurality of nodes. A scheduler executing on a processor manages deployment of guests to the plurality of nodes including a first node and a second node, where a first guest is associated with an image file that includes a first subunit and a second subunit. The image registry is queried for at least one node of the plurality of nodes hosting the first subunit and/or the second subunit and the first node is determined to host the first subunit. The first guest is scheduled to the first node based on the first node hosting the first subunit.

20 Claims, 5 Drawing Sheets

(51) Int. Cl.
*G06F 8/61* (2018.01)
*G06F 16/2457* (2019.01)
(52) U.S. Cl.
CPC .... *G06F 16/24573* (2019.01); *G06F 9/45558* (2013.01); *G06F 2009/45583* (2013.01)
(58) Field of Classification Search
CPC . G06F 2009/45583; G06F 2009/45562; G06F 2009/4557
See application file for complete search history.

(56) References Cited

U.S. PATENT DOCUMENTS

| | | |
|---|---|---|
| 10,291,706 B1 | 5/2019 | Zhao et al. |
| 2007/0240160 A1* | 10/2007 | Paterson-Jones ......... G06F 8/60 718/104 |
| 2013/0332917 A1* | 12/2013 | Gaither ................ G06F 8/656 717/170 |
| 2017/0220329 A1 | 8/2017 | Yang et al. |
| 2018/0349150 A1 | 12/2018 | Wong et al. |

OTHER PUBLICATIONS

Comparison of Container Schedulers; by Armand Grillet; https://medium.com/@ArmandGrillet/comparison-of-container-schedulers-c427f4f7421, Feb. 24, 2016; pp. 1-29.

What is a Container Scheduler?, Technology Conversations; https://technologyconversations.com/2017/12/14/what-is-a-container-scheduler/; Dec. 14, 2017, retrieved Jan. 22, 2018; pp. 1-3.

* cited by examiner

IMAGE SUBUNIT BASED GUEST SCHEDULING

CROSS REFERENCES TO RELATED APPLICATIONS

This application is a continuation of and claims priority to and the benefit of U.S. patent application Ser. No. 15/890,654, filed Feb. 7, 2018, the entire content of which is hereby incorporated by reference.

BACKGROUND

The present disclosure generally relates to scheduling guests in cloud environments. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests enable a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to maximize the density of isolated guests in a given hardware environment, for example, in a multi-tenant cloud. In many cases, containers may be leaner than virtual machines because a container may be operable without a full copy of an independent operating system, and may thus result in higher compute density and more efficient use of physical hardware, enabling additional flexibility and scalability of deployment. Multiple containers may also be clustered together to perform a more complex function than the respective containers are capable of performing individually. In an example, a container and/or a cluster of containers may be implemented specifically to execute certain specific tasks and/or types of tasks. In a typical system, guests may be rapidly deployed through the use of image files storing ready to execute copies of the deployable guests.

SUMMARY

The present disclosure provides a new and innovative system, methods and apparatus for image subunit based guest scheduling. In an example, a memory stores an image registry, which stores a plurality of reference entries each associated with subunits hosted on each node of a plurality of nodes. A scheduler executing on a processor manages deployment of guests to the plurality of nodes including a first node and a second node, where a first guest is associated with an image file that includes a first subunit and a second subunit. The image registry is queried for at least one node of the plurality of nodes hosting the first subunit and/or the second subunit. The first node is determined to host the first subunit and the first guest is scheduled to the first node based on the first node hosting the first subunit.

Additional features and advantages of the disclosed method and apparatus are described in, and will be apparent from, the following Detailed Description and the Figures.

DETAILED DESCRIPTION OF EXAMPLE EMBODIMENTS

Figure 1:
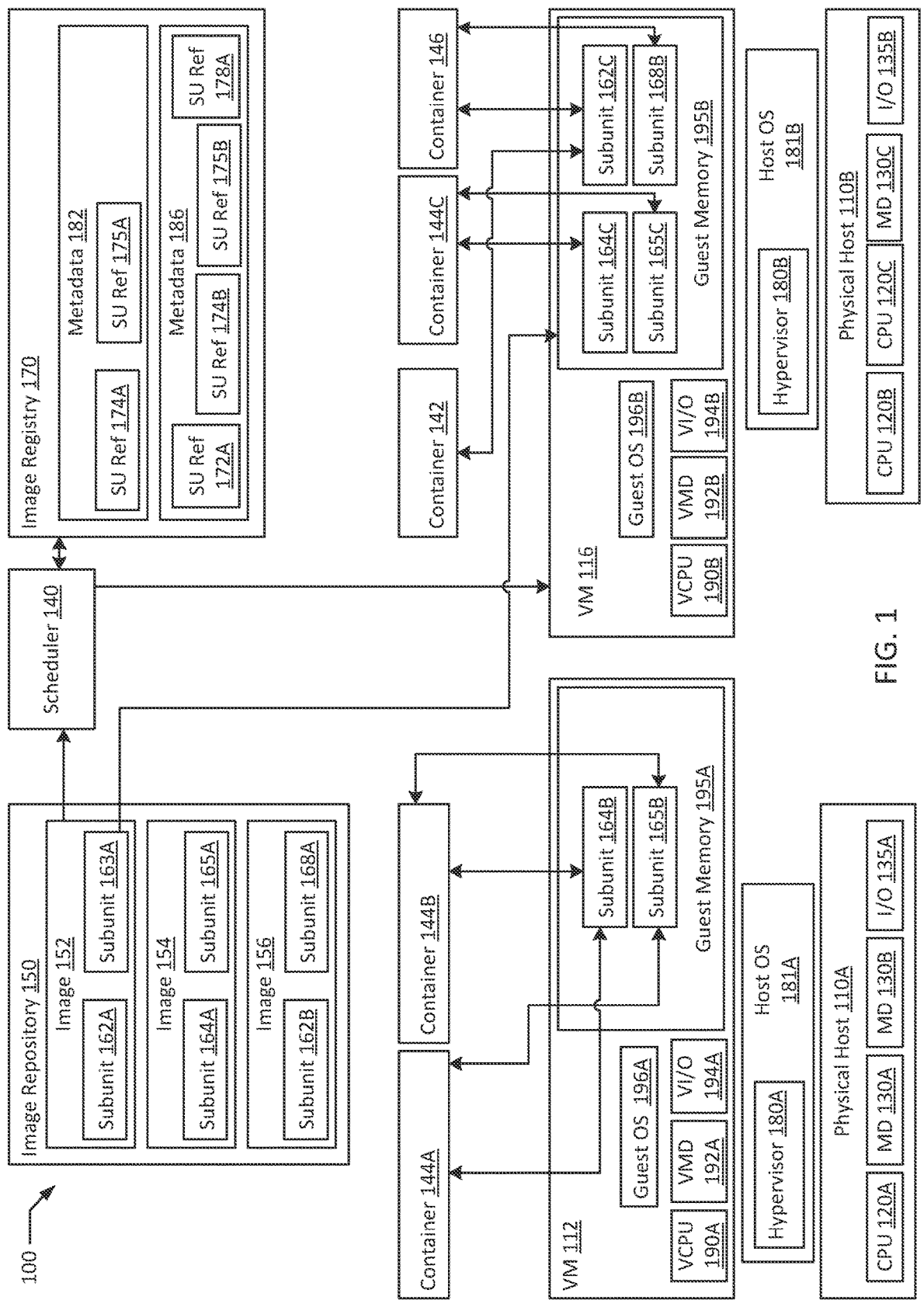
FIG. 1 is a block diagram of an image subunit based guest scheduling system according to an example of the present disclosure.

In computer systems utilizing isolated guests, typically, virtual machines and/or containers are used. In an example, a virtual machine ("VM") may be a robust simulation of an actual physical computer system utilizing a hypervisor to allocate physical resources to the virtual machine. In some examples, a container based virtualization system such as Red Hat® OpenShift® or Docker® may be advantageous, as container based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. In large scale implementations, container schedulers, such as those included in container orchestrators (e.g., Kubernetes®), generally respond to frequent container startups and cleanups with low latency through their scheduler components. Containers may enable wide spread, parallel deployment of computing power for specific tasks. In a typical example, a container may be instantiated to process a specific task and reaped after the task is complete.

Due to economies of scale, containers tend to be more advantageous in large scale hardware deployments where the relatively fast ramp-up time of containers enables for more flexibility for many different types of applications to share computing time on the same physical hardware, for example, in a private or multi-tenant cloud environment. In some examples, where containers from a homogenous source are deployed, it may be advantageous to deploy containers directly on physical hosts. In some multi-tenant clouds, it may be advantageous to deploy containers and groups of containers within virtual machines as the hosting service may not typically be able to predict dependencies for the containers such as shared operating systems, and therefore, using virtual machines adds flexibility for deploying containers from a variety of sources on the same physical host. In an example, a physical and/or virtual host node may host hundreds of containers, each of which may independently execute tasks.

In virtualized computer systems, image files may be used for creating hosting environments (e.g., VMs, containers, and clusters of containers) for running application programs. The runtime environment necessary for the running of desired application code can be loaded onto the computer system in the form of an image file, for example, a Docker® image file or an image file for building a virtual machine. These image files may be collections of logical subunits of data, for example, container layers or programs installed as part of a virtual machine build. To create fully functional environments without unnecessary overhead, guest image files are typically constructed from individual layers, each of which includes a necessary component for the desired operation of the applications intended to run in the guest, these layers combining together to form an image file to launch one (e.g., a single VM, a single container) or more guests (e.g., Kubernetes® pod) for the desired purpose. A layer may be as large as a full operating system or as small as an individual configuration file, and it is not uncommon to need dozens of layers in a full image file. Each layer may provide a specific functionality necessary for the successful operation of the application in the container. These container image definitions are generally stored in the form of container images, available to be distributed to a wide array of host nodes as required. In a typical example, layers in container images are built on top of each other where each layer inherits an immutable parent-child relationship. A container with, for example, three layers, A, B and C, would be the parent of a container image with four layers, for example, A, B, C and D. In the example, container ABC would be the parent of container image ABCD, which would be defined by its relationship to container ABC as being a container that is layer D added to container image ABC.

Image files have a size that takes up space in a local memory device on the host node hosting the guest(s) instantiated from the image file, which fills up the local memory device's capacity. In a typical example, persistent storage devices may store data in devices such as hard drive disks ("HDD"), EEPROM devices (e.g., solid state drives ("SSD")), and/or persistent memory devices (e.g., Non-Volatile Dual In-Line Memory Modules ("NVDIMMs")). A typical storage unit may be additionally implemented with efficiency, security, and/or performance optimizations. In many storage units, additional features may be implemented for fault tolerance or redundancy purposes, for example, a Redundant Array of Independent Disks ("RAID") system may be implemented to provide high performance live backups of stored data. In an example, RAID systems may also be configured to increase read/write throughput on storage media. For example, storage capacity may be greatly enhanced through implementing compression and/or deduplication on a given storage device. Deduplication may be performed on many different levels, for example, on a block level, a file level, a file system level, or even a storage device level. Similarly, compression may typically be available on a block and/or a file level. A block may typically be a granular denomination of sequence of bits of physical storage in a fixed size that may be addressed and accessed on a storage device, e.g., 512 bytes, 4 kB, 8 kB, 16 kB, 32 kB, etc. In an example, the smaller the block sizes a storage device is divided into, the higher the density of data that can be stored on the device. For example, a 1 kB file may occupy an entire block regardless of how much empty space is left over in the block.

To illustrate deduplication and compression, in an example, an email server may receive an email message with a 1 MB attachment for an entire 1,000 employee company. Without deduplication, the attachment would be stored 1,000 times resulting in 1 GB of storage used. However, since the attachment is identical, with file level deduplication, only one copy actually needs to be stored with virtual links to that copy made to each recipient, resulting in a nearly 99.9% reduction in space usage for this example email message. A typical method of lossless or reversible data compression may entail encoding a file to represent repeated data with short form symbols. For example, "aaaaa" may be represented effectively as "5a" resulting in a 60% savings in space used. Similarly, repeated data may be given a symbol representation and therefore result in significant space savings. For example, a log file for user logins may repeatedly store lines similar to "[User1] successful login from [IP address]." In the example, "successful login from" may be compressed to a single character and therefore a single byte, therefore resulting in a 95% reduction in space from, for example, 21 bytes to 1 byte. In the email server example, if the 1 MB attachment is a text file, the addition of compression may further reduce the storage space taken by upwards of 90%, resulting in an overall 99.99% space savings. Compression and deduplication may be performed at different granularities, with corresponding performance penalties and efficiency advantages. Storage capacity optimizations may also include optimizations of metadata space and caching, for example, each file stored in a storage system requires a logical address to be accessed. A system storing many small files may therefore run out of addresses before it runs out of space, so increasing the size of the address pool (e.g., number of inodes, reducing block size) may allow more storage to be used. However, more addresses may require more seek time per access resulting in an overall performance penalty. Security optimizations may include features such as encryption and scrambling.

Compression and deduplication often come with significant performance penalties. In an example, compression or block level deduplication typically slows down file writes by 50-60%, even up to 90%. In addition, many file types may benefit very little from compression or very granular (e.g., block level) deduplication. For example, most commonly utilized storage formats for image and video data are already compressed, so additional compression may result in little to no space savings at the cost of significant latency.

A significant advantage of containerized virtualization is the speed with which an application may be scaled up. For example, to launch a container or container cluster with a pre-cached image file, only 5-15 seconds may be required. However, at typical network speeds of 10-100 Mbps, downloading an image file for a pod may take a similar 5-15 seconds. It may be ideal from a latency and bandwidth standpoint to always load files from a repository located in the same data center if not the same physical machine as the local memory, but where this is not possible, there is a challenge regarding the prioritization of the benefits of centralizing repositories in distant locations versus the speed and bandwidth impacts experienced at image file loading time. This image repository may be located in a centralized location over a network. Centralizing a repository has significant drawbacks, for example, a network retrieval step can incur network latency and risks of network failure, while centralizing the processing and I/O of image file retrieval can create a bottleneck where many local nodes need to wait for the image repository to process their requests. However, the advantages presented for maintainability may often favor limiting the number of image repositories in a cloud hosting environment. Therefore, to speed up container instantiation, and reduce user perceived latency, container schedulers are often configured to schedule new copies of containers preferentially on nodes that already host another copy of that container. The rationale behind such scheduling heuristics is that if a copy of the container is running, its image file is likely to still be in a temporary directory. However, this scheduling heuristic may typically end up being flawed where any significant time passes between the scheduling of two copies of a container.

Specifically, a container host (e.g., a VM or physical host) that is responding to many instantiation requests due to hosting applications that flexibly scale may typically run low on local storage space. A typical response by a system is then to perform garbage collection clearing temporary directories such as those where image files are stored. A typical garbage collector program on the computer system will identify and delete unused image files to create space for loading the new image files. Typically, a request is made for garbage collection when a temporary local storage runs low on storage space, resulting in one (or more) entire image file(s) being deleted. Then a new image file may be retrieved from an image repository. In a typical hosting environment, certain hosting nodes may typically have high rates container instantiation and reclamation, for example, on nodes providing flexible capacity to applications, but not dedicated to any specific applications. In the example, a typical container scheduler may determine that these nodes recently launched a container from a given image file, and may therefore assign new copies of that container to the node under the assumption that the associated image file is still cached in a temporary directory. However, since a typical node may host several hundred containers but may only maintain temporary storage for a dozen or so image files, oftentimes nodes performing the most instantiations are also those where a recently loaded image file may be quickly garbage collected.

The present disclosure overcomes both the latency and storage capacity hurdles of loading image files to local host nodes through image subunit based guest scheduling. In most hosting environments, there is a significant level of overlap between subunits of image files of different containers, regardless of subunit granularity. For example, subunits may be as small as a 512 byte physical storage block or as large as a gigabyte sized operating system layer. Through performance analytics, it has been determined that as a general rule, there is typically at least a 30% (and often much higher) overlap in the unique blocks in a given image file and at least one other image file in the same hosting environment, where unique blocks are the blocks remaining in an image file after block level deduplication is performed. For example, while a runtime environment (e.g., Java®) may be the third layer in one image file and the fifth layer in another image file, even two different but closely related versions of Java® would likely have very high block level repetition. In a system executing block level deduplication, only one copy of a given unique block is required to be stored physically, allowing each other copy of the unique block to be a logical reference to the same physically stored block. Therefore, in the example, every container executing Java® on a given VM host node may reference the same physical blocks of data in the VM's memory. It is therefore possible to avoid reloading any unique blocks that are already present in a given host node when loading a new image file if block level deduplication is executed. To a lesser extent, less granular deduplication may also have significant space and transmission reductions depending on the container images being launched in the environment. For example, file, or layer level deduplication may be significantly advantageous where different containers in the environment are on homogenous versions of different code modules without incurring the additional processor and write speed overhead of block level deduplication. Deduplicated subunits stored in a given host node may be given unique identifiers (e.g., through a hash algorithm) and these unique identifiers may be stored in an image registry associated with a container scheduler. The container scheduler may then query for candidate nodes to host a given image file based on the shared subunits (e.g., blocks, layers) between the image file and each hosting node, thereby locating nodes requiring minimal reloading of data from an image repository. In an example, a hash lookup of subunit similarity may be orders of magnitude faster than loading the same subunits through a network, so the extra processing cost incurred may be vastly outweighed by even a modest 10-20% reduction in the amount of data to be transmitted.

FIG. 1 is a block diagram of an image subunit based guest scheduling system according to an example of the present disclosure. The system 100 may include one or more physical hosts 110A-B. Each physical host 110A-B may in turn include one or more physical processors (e.g., CPU 120A-C) communicatively coupled to memory devices (e.g., MD 130A-C) and input/output devices (e.g., I/O 135A-B). As used herein, physical processor or processors 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device 130A-C refers to a volatile or non-volatile memory device, such as RAM, ROM, EEPROM, NVDIMM, or any other device capable of storing data. As discussed herein, I/O device 135A-B refer to devices capable of providing an interface between one or more processor pins and an external device, the operation of which is based on the processor inputting and/or outputting binary data. CPUs 120A-C may be interconnected using a variety of techniques, ranging from a point-to-point processor interconnect, to a system area network, such as an Ethernet-based network. Local connections within each physical host 110A-B, including the connections between a processor 120A and a memory device 130A-B and between a processor 120A and an I/O device 135A may be provided by one or more local buses of suitable architecture, for example, peripheral component interconnect (PCI).

In an example, physical hosts 110A-B may run one or more isolated guests, for example, VMs 112 and 116, containers 142, 144A-C, and 146. In an example, any of containers 142, 144A-C, and 146 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple containers and/or pods in multiple physical locations. In an example, VMs 112 and 116 may be VMs executing on physical hosts 110A-B. In an example, containers 144A-B may execute on VM 112 while containers 142, 144C, and 146 may execute on VM 116. In an example, scheduler 140, image repository 150, and/or image registry 170 may execute either independently or within a container. In an example, any of containers 142, 144A-C, and 146 may be executing directly on either of physical hosts 110A-B without a virtualized layer in between. In an example, isolated guests may be further nested in other isolated guests. For example, VMs 112 and 116 may host containers (e.g., containers 142, 144A-C, and 146). In addition, containers and/or VMs may further host other guests necessary to execute their configured roles. For example, a VM (e.g., VM 112 or 116) and/or a container (e.g., containers 142, 144A-C, and 146) may further host a Java® Virtual Machine ("JVM") if execution of Java® code is necessary.

System 100 may run one or more VMs (e.g., VMs 112 and 116), by executing a software layer (e.g., hypervisor 180A-B) above the hardware and below the VMs 112 and 116, as schematically shown in FIG. 1. In an example, the hypervisors 180A-B may be components of respective host OSes 181A-B executed by the system 100. In another example, the hypervisors 180A-B may be provided by an application running on respective OSes 181A-B, or may run directly on respective physical hosts 110A-B without an operating system beneath them. Hypervisor 180A-B may virtualize the physical layer, including processors, memory, and I/O devices, and present this virtualization to VMs 112 and 116 as devices, including virtual central processing units ("VCPUs") 190A-B, virtual memory devices ("VMDs") 192A-B, virtual input/output ("VI/O") devices 194A-B, and/or guest memories 195A-B. In an example, a container may execute directly on host OSs 181A-B without an intervening layer of virtualization.

In an example, a VM 112 may be a virtual machine and may execute a guest OS 196A which may utilize the underlying VCPU 190A, VMD 192A, and VI/O 194A. One or more isolated guests (e.g., containers 144A-B) may be running on VM 112 under the respective guest OS 196A. Processor virtualization may be implemented by the hypervisor 180A scheduling time slots on one or more physical processors 120A such that from the guest operating system's perspective those time slots are scheduled on a virtual processor 190A.

VM 112 may run on any type of dependent, independent, compatible, and/or incompatible applications on the underlying hardware and host OS 181A. In an example, containers 144A-B running on VM 112 may be dependent on the underlying hardware and/or host OS 181A. In another example, containers 144A-B running on VM 112 may be independent of the underlying hardware and/or host OS 181A. In an example, containers 144A-B running on VM 112 may be compatible with the underlying hardware and/or host OS 181A. Additionally, containers 144A-B running on VM 112 may be incompatible with the underlying hardware and/or OS. The hypervisor 180A may manage memory for the host OS 181A as well as memory allocated to the VM 112 and guest OS 196A such as guest memory 195A provided to guest OS 196A. In an example, VM 116 and its associated components guest OS 196B, VCPU 190B, VMD 192B, VI/O 194B, and guest memory 195B may perform similar corresponding roles to the components in VM 112. Similarly, hypervisor 180B and host OS 181B may function in similar roles as related to VM 116 as hypervisor 180A and host OS 181A do to VM 112. In an example, s containers 142, 144C, and 146 may execute on VM 116 or directly on physical host 110B. In an example, a network connecting physical hosts 110A-B with scheduler 140, image repository 150, and image registry 170 may be any form of suitable network for enabling communications between computing devices, for example, a public network (e.g., the Internet), a private network (e.g., a local area network (LAN) or wide area network (WAN)), or a combination thereof.

In an example, image repository 150 and image registry 170 may be any form of suitable storage systems for image files, including subunits (e.g., subunits 162A, 163A, 164A, 165A, 162B, and 168A) of images 152, 154, and 156 and workload data and/or metadata (e.g., metadata 182 and 186), for example a relational database. The image repository 150 and/or image registry 170 may be stored in a database associated with a database management system ("DBMS"). A DBMS is a software application that facilitates interaction between the database and other components of the system 100. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, a relational database may be implemented with add-on packages and/or services for additional functionality and security (e.g., Red Hat Database®). In an example, image repository 150 and/or image registry 170 may be stored in a database organized as a formal database with a schema such as a relational schema with defined tables, indices, links, triggers, various commands etc. In some examples, image repository 150 and/or image registry 170 may not be organized as a formal database, but may instead be an alternative storage structure capable of holding the information stored in image repository 150 and/or image registry 170, including but not limited to a file, folder, directory, registry, array, list, etc.

In an example, scheduler 140 may be a component responsible for assigning compute tasks executed in containers to various host nodes (e.g., VMs 112 and 116, physical hosts 110A-B). In the example, scheduler 140 is responsible for launching containers (e.g., containers 142, 144A-C, and 146) on the selected hosts. In an example, scheduler 140, image repository 150, and/or image registry 170 may be included in a container orchestrator (e.g., Kubernetes®). In an example, scheduler 140, image repository 150, and/or image registry 170 may be implemented via any form of executable code (e.g., executable file, script, application, service, daemon).

In an example, image 152 stored in image repository 150 is associated with container 142 launched with image 152, and image 152 includes subunits 162A and 163A. Image 154 stored in image repository 150 is associated with containers 144A-C launched with image 154, and image 154 includes subunits 164A and 165A. Image 156 stored in image repository 150 is associated with container 146 launched with image 156, and image 156 includes subunits 162B and 168A. In the example, subunit 162B may be a second copy of subunit 162A. In an example, a subunit (e.g., subunits 162A-165A, 162B, and 168A) may be a layer of respective images 152, 154, and 156. In other examples, a subunit (e.g., subunits 162A-165A, 162B, and 168A) may be more granular subdivisions of respective images 152, 154, and 156 than layers, for example, directories, files, storage blocks. In an example, subunits 164B and 165B stored in guest memory 195A may be local copies of subunits 164A and 165A used in the execution of containers 144A-B. In the example, subunits 162C, 164C, 165C, and 168B may be local copies of subunits 162A, 164A, 165A, and 168A stored in guest memory 195B for the execution of containers 142, 144C, and 146. In an example, VMs 112 and 116, specifically guest memories 195A-B may execute with an appropriate level of deduplication (e.g., file level, block level, etc.) for the granularity of subunits 162A-165A, 162B, and 168A. In an example, metadata 182 may be associated with VM 112, and may include metadata regarding the subunits currently stored in guest memory 195A. For example, SU Ref 174A may be a subunit reference for subunit 164B, and SU Ref 175A may be a subunit reference for subunit 165B. In the example, SU Ref 174A may be a hash signature for subunit 164B used by scheduler 140 for matching the availability of subunit 164B on VM 112. In an example, metadata 182 (where appropriate) may also include additional features of subunits on guest memory 195A. For example, where subunits 162A-165A, 162B, and 168A are blocks, SU Refs 174A, 175A, 172A, 174B, 175B, and 178A may simply be hash identifiers for the subunit blocks. However, metadata 182 and 186 may additionally include block size information for guest memories 195A-B to validate that identifiers for the same size blocks are being compared. In an example where subunits 162A-165A, 162B, and 168A are layers, each of SU Refs 174A, 175A, 172A, 174B, 175B, and 178A may additionally include layer size information for subunits SU Refs 162A-165A, 162B, and 168A to allow a further comparison of cumulative shared size between shared layers (which are not of consistent size). For example, an operating system layer may be larger in size than the rest of the layers in an image file combined. In an example, metadata 186 may be associated with VM 116 and guest memory 195B, providing comparable information to metadata 182. In an example, SU Refs 172A, 174B, 175B, and 178A may correspond to subunits 162C, 164C, 165C, and 168B stored in guest memory 195B and referenced by containers 142, 144C, and 146.

Figure 2:
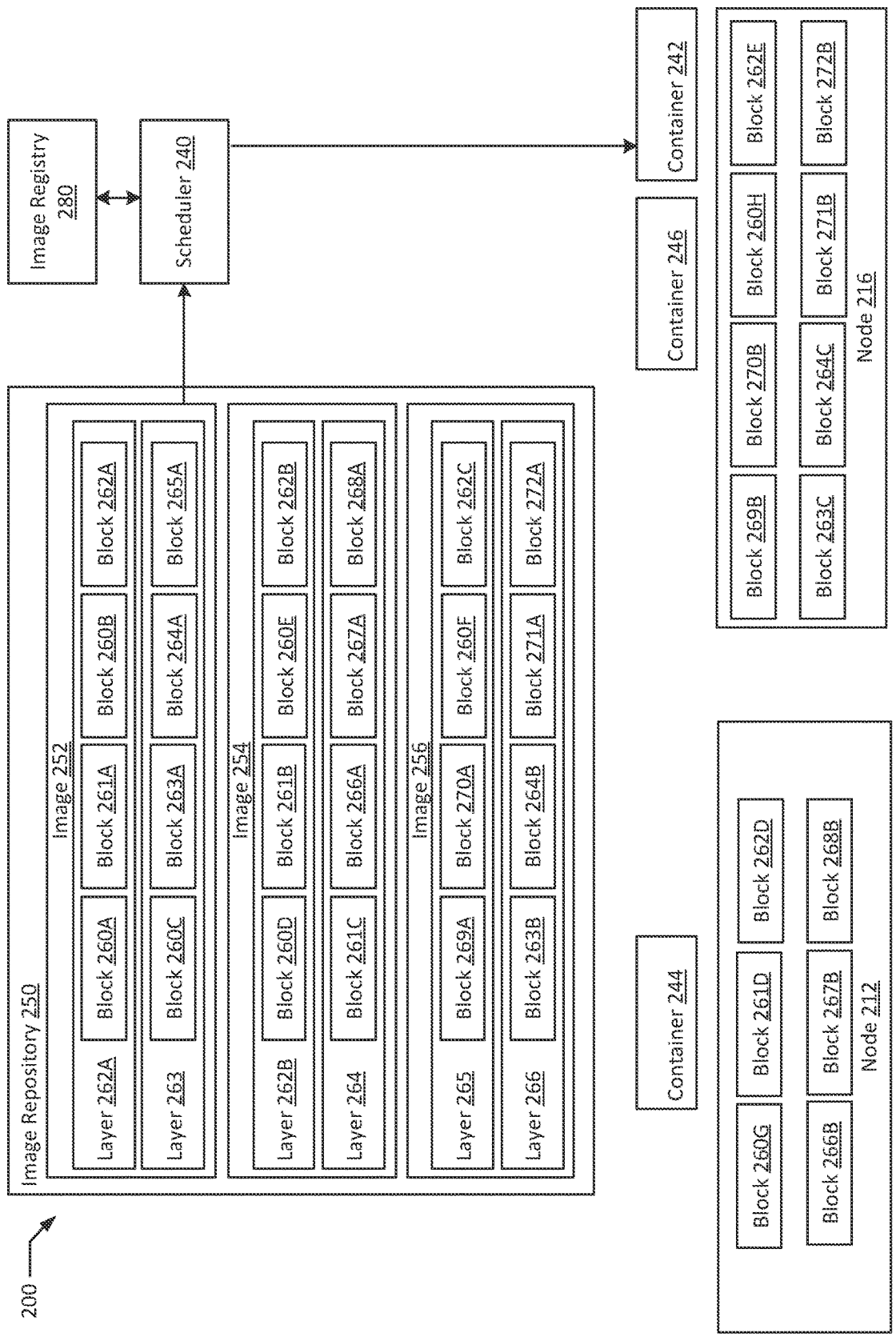
FIG. 2 is a block diagram illustrating a memory block level image subunit based guest scheduling system according to an example of the present disclosure.

FIG. 2 is a block diagram illustrating a memory block level image subunit based guest scheduling system according to an example of the present disclosure. Example system 200 as depicted in FIG. 2 is a similar system to system 100, where subunits (e.g., blocks 260A-H, 261A-D, 262A-D, 263A-C, 264A-C, 265A, 266A-B, 267A-B, 268A-B, 269A-B, 270A-B, 271A-B, and 272A-B) are storage blocks (e.g., separately addressable 4 kB storage units in memory). In an example, each subgrouping of blocks (e.g., blocks 260A-H, 261A-D, 262A-D, 263A-C, 264A-C, 265A, 266A-B, 267A-B, 268A-B, 269A-B, 270A-B, 271A-B, and 272A-B) represents copies of blocks containing the same binary contents. In an example, deduplication may enable multiple copies of the same block (e.g., blocks 260A-F on image repository 250) to be logical references to the same physically stored block. In the example, image repository 250 stores multiple image files (e.g., images 252, 254, and 256). In the example, image 252 includes layer 262A, which includes blocks 260A-B, 261A, and 262A, and layer 263, which includes blocks 260C, 263A, 264A, and 265A. Image 254 includes layer 262B which, includes blocks 260D-E, 261B, and 262B, and layer 264, which includes blocks 261C, 266A, 267A, and 268A. In an example, layers 262A and 262B are copies of the same layer, for example, two copies of a shared runtime environment. Image 256 includes layer 265, which includes blocks 269A, 270A, 260F, and 262C, and layer 263, which includes blocks 263B, 264B, 271A, and 272A. In an example, container 244 is instantiated from image 254, container 242 is instantiated from image 252, and container 246 is instantiated from image 256.

In an example, node 212 hosting container 244 stores blocks 260G, 261D, 262D, 266B, 267B, and 268B in memory. In the example, two copies of block 260G included in image 254 (e.g., blocks 260D and 260E) are deduplicated and stored once as block 260G, while two copies of block 261D included in image 254 (e.g., blocks 261B and 261C) are deduplicated and stored once as block 261D. In an example, two duplicated blocks may store two configuration files with the same data (e.g., where two different applications are configured similarly). In an example, a given image for a logo may be larger than the granular block size (e.g., a 100 kb image) and instances of the logo appearing in different programs or views may be deduplicated at a block level. In an example, node 216 is hosting container 246, and stores copies of each block of image 256 (e.g., blocks 269A, 270A, 260F, 262C, 263B, 264B, 271A, and 272A) as blocks 269B, 270B, 260H, 262E, 263C, 264C, 271B, and 272B. In an example, image registry 280 stores metadata referencing the unique blocks stored on each of nodes 212 and 216, for example, in a hash value. Image registry 280 may additionally store block size data for nodes 212 and 216. In an example, image repository 250 stores a metadata profile of each image file (e.g., images 252, 254, and 256) stored in image repository 250. In an example, scheduler 240 retrieves a metadata profile for an image file to compare against the metadata in image registry 280 to find low latency hosts for newly instantiated containers. In an example where multiple block sizes are implemented on different nodes, multiple profiles may be stored in image repository 250 corresponding to unique block hash values for blocks of different granularity to allow for comparison to different host nodes, for example, if nodes 212 and 216 use 4 kb blocks, but VMs 112 and 116 are also available as hosts with 32 kB blocks.

In an example, image 252 shares three blocks with image 254 (e.g., blocks 260A, 261A, and 262A), and therefore launching container 242 on node 212 would require loading three new blocks to node 212 (e.g., blocks 263A, 264A, and 265A). In the example, image 252 shares four blocks with image 256 (e.g., blocks 260A, 262A, 263A, and 264A), and would therefore require the loading of only two new blocks to node 216 (e.g., blocks 261A and 265A). Therefore, even though image 252 shares layer 262A with image 254 (e.g., layer 262B), less network traffic is required to host container 242 on node 216 than node 212. Scheduler 240 may then determine to host container 242 on node 216.

Figure 3:
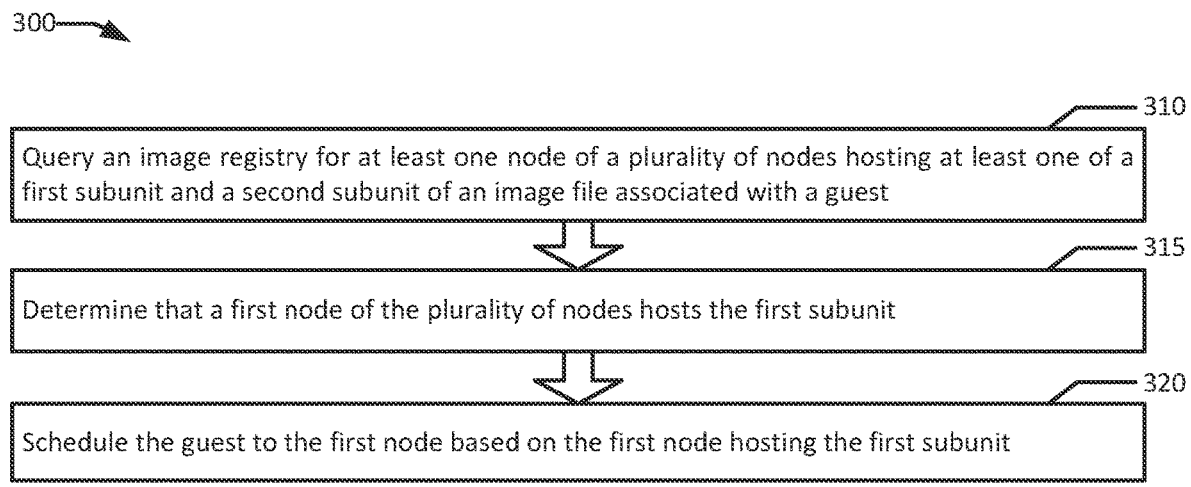
FIG. 3 is a flowchart illustrating an example of image subunit based guest scheduling according to an example of the present disclosure.

FIG. 3 is a flowchart illustrating an example of image subunit based guest scheduling according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a scheduler 140.

Example method 300 may begin with querying an image registry for at least one node of a plurality of nodes hosting at least one of a first subunit and a second subunit of an image file associated with a guest (block 310). In an example, scheduler 140 queries image registry 170 for a node (e.g., VM 112 or 116, or physical hosts 110A or 110B) on which to launch container 142 from image 152. In the example, image repository 150 stores a plurality of image files (e.g., images 152, 154, and 156) with which containers 142, 144A-C, and 146 executing on VMs 112 and 116 are launched. In an example, image repository 150 includes profile data for each of images 152, 154, and 156, for example, in the form of metadata identifying the subunits (e.g., subunits 162A-165A, 162B, and 168A) included in each of images 152, 154, and 156. In an example, to launch container 142 from image 152, profile data identifying subunits 162A and 163A as subunits of image 152 is retrieved by the scheduler 140 from image repository 150.

In an example, image registry 170 contains an up to date listing of the subunits currently hosted in host nodes (e.g., VMs 112 and 116) managed by scheduler 140. In the example, metadata 182 may include subunit references 174A and 175A identifying that VM 112 hosts subunits 164B and 165B (e.g., copies of subunits 164A and 165A). In the example, metadata 186 may include subunit references 172A, 174B, 175B, and 178A identifying that VM 116 hosts subunits 162C, 164C, 165C, and 168B (e.g., copies of subunits 162A, 164A, 165A, and 168A). In an example, metadata 182 may further include additional information regarding its associated VM 112. For example, metadata 182 may include deduplication settings, block size settings, compression settings, encryption settings, etc. of guest memory 195A. In an example, metadata 182 may additionally include the size of subunits 164B and 165B in the event that subunits are not of uniform size (e.g., where subunits are layers or files). In an example, a subunit reference (e.g., SU Refs 174A, 175A, 172A, 174B, 175B, and 178A) may be any form of identifier for a subunit, for example, a hash value or an assigned identifier (e.g., a reference code for a layer). In an example, subunit 162A is an image file layer, for example, a layer that includes libc++ to allow the execution of C++ code. In the example, both image 152 and 156 require execution of C++ code so they both include the module (e.g., as subunits 162A and 162B). In the example, since container 146 based on image 156 is already executing on guest memory 195B, subunit 162B is preloaded to guest memory 195B as subunit 162C. In an example, metadata 186 may include a size (e.g., in kB) of subunit 162C and an identifier that the version of libc++ in the form of subunit 162C is present on VM 116.

In some examples, rather than files or groups of files in the form of layers, subunits may be data blocks as physically stored by the storage hardware in the system (e.g., guest memories 195A-B, memory devices 130A-C, image repository 150). In such examples, rather than an assigned identifier, a hash label for set content values of blocks may be computed by hashing the contents of the blocks. In an example, content blocks may be subunits and hash values may be subunit references. In an example, where a third subunit shares the same subunit reference (e.g., hash value) as SU Ref 172A, a copy of subunit 162C may be loaded in lieu of transmitting a new copy of the third subunit. In the example, VM 116 may create a new virtual reference to subunit 162C rather than storing a separate copy of subunit 162C to save storage capacity.

A first node of the plurality of nodes is determined to hosts the first subunit (block 315). In an example, scheduler 140 determines that VM 116 hosts subunit 162C shared by image 152 as subunit 162A. In some examples, VM 112 may also host a copy of subunit 163A, and thereby an equal count of subunits of image 152 may be hosted on different nodes (e.g., VMs 112 and 116). In an example, a comparison may be made and upon determining that subunit 162A is larger than subunit 163A, and therefore hosting container 142 based on image 152 on VM 116 is preferable to hosting on VM 112. In such examples, a cumulative matching size of the subunits between a given image file and its shared subunits with each host node based on metadata from image registry 170 may be computed and compared, as oftentimes matching size may be a stronger indicia of network latency reduction than matching subunit count. In some examples, a count of matching subunits may be computed instead, for example, where subunits are of similar size (e.g., subunits as storage blocks). In an example, for highly repetitive data, matching size may not be consistent with required transmission amounts. For example, if a single block of unique data is repeated fifty times in an image file and constitutes 30% of the image file's size, transmitting that one file once may be significantly faster than transmitting separate files for 20% of the image file's size. In the example, greater matching size (e.g., 30% from matching one subunit) is less advantageous than lesser matching size (e.g., 20% matching based on thirty subunits). In examples where deduplication is active on host nodes, unique matching of subunits may be more advantageous than cumulative matching of subunits. However, where deduplication is inactive, cumulative size matching may be advantageous.

The guest is scheduled to the first node based on the first node hosting the first subunit (block 320). In an example, container 142 is scheduled to VM 116 by scheduler 140. In the example, VM 116 may be configured to deduplicate copies of subunit 162C, and subunit 162C may be logically referenced and linked to container 142 rather than a new copy of subunit 162A being loaded from image repository 150. In an example, a container engine (e.g., Docker® engine) on VM 116 instantiates container 142 with subunit 162C and a newly loaded copy of subunit 163A.

Figure 4:
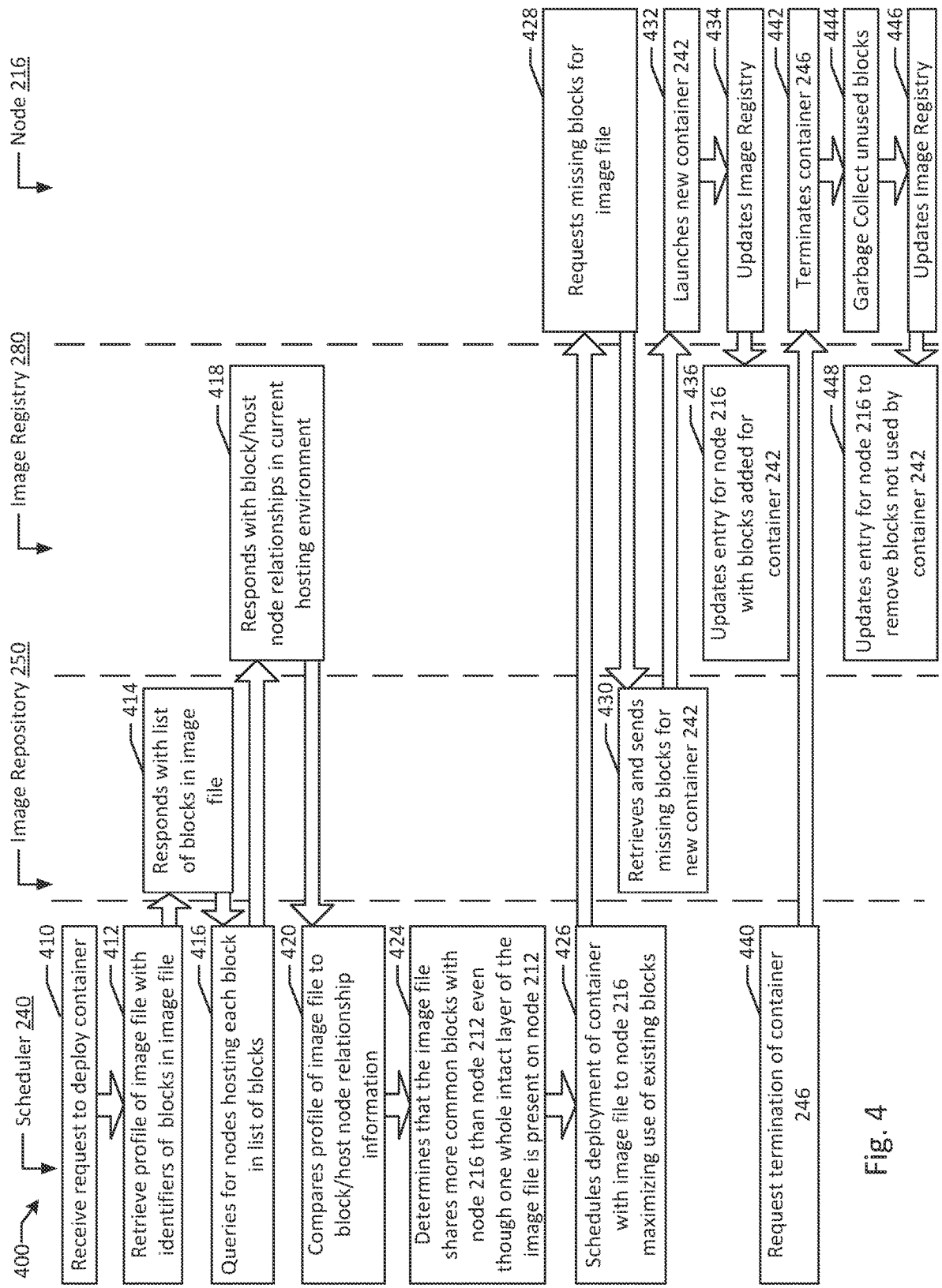
FIG. 4 is flow diagram of an example of image subunit based guest scheduling according to an example of the present disclosure.

FIG. 4 is flow diagram of an example of image subunit based guest scheduling according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, scheduler 240, image repository 250, image registry 280, and node 216 instantiate and reclaim containers on node 216.

In example system 400, scheduler 240 receives a request to instantiate a container (block 410). In the example, scheduler 240 retrieves a profile of image 252 (e.g., in the form of metadata) with identifiers for each of the unique storage blocks of data (e.g., blocks 260A, 261A, 262A, 263A, 264A, 265A) included in image 252 (block 412). In an alternative example, for example, where one or more nodes 212 and 216 do not support block level image reconstruction, unique layer data may instead be retrieved (e.g., layers 262A and 263 for image 252). In an example, image repository 250 responds to scheduler 240 with a list of blocks and/or block identifiers (e.g., hash values) for image 252 (block 414). Scheduler 240 may then take the block profile information of image 252 to query image registry 280 for nodes hosting each block identified by image repository 250 (block 416). For example, image registry 280 may be queried for the block reference identifiers of blocks 260A, 261A, 262A, 263A, 264A, and 265A.

In an example, image registry 280 responds to scheduler 240 with block to node relationships in the current hosting environment (block 418). For example, image registry 280 may identify that three of the blocks of image 252 are present on node 212 (e.g., blocks 260G, 261D, and 262D), while four of the blocks of image 252 are present on node 212 (e.g., blocks 260H, 262E, 263C, and 264C). In other examples, where subunits are layers or files, a subunit match count comparison, a subunit match cumulative size comparison, and/or a unique subunit match comparison may be conducted and reported. In an example, scheduler 240 compares profile information from image repository 250 to the block to node relationships from image registry 280 (block 420). For example, scheduler 240 may compare total similarity values between image 252 and current subunits hosted on each node in system 200. In an example, additional considerations may be factored in (e.g., network latency to each host node, current capacity of the host nodes, image specific prioritizations of different compute resources). In an example, scheduler 240 determines that image 252 shares more common blocks (four) with node 216 than with node 212 (three) even though one whole intact layer of image 252 is present on node 212 in the form of blocks 260G, 261D, and 262D (e.g., layer 262B which is the same as layer 262A) (block 424).

In an example, scheduler 240 schedules deployment of container 242 with image 252 to node 216 to maximize the reuse of existing blocks and increase compute density (block 426). In an example, node 216 requests missing blocks 261A and 265A from image repository 250 (block 428). In the example, image repository 250 sends missing blocks 261A and 265A for new container 242 (block 430). In the example, node 216 launches container 242 (block 432). Node 216 may then send an update to image registry 280 identifying that copies of blocks 261A and 265A are now stored on node 216 (block 434). In the example, image registry 280 stores references for blocks 261A and 265A in the entry for node 216 (block 436).

In an example, scheduler 240 sends a request to terminate container 246 on node 216 (block 440). For example, load may have reduced for the application executing on container 246. In another example, container 246 may be reinitialized in another data center for redundancy and/or disaster recovery purposes. In an example, container 246 may be terminated after completing execution of its assigned processing task, for example, without input from scheduler 240. In an example, node 216 terminates container 246 (block 442). In the example, node 216 garbage collects unused blocks 269B, 271B, and 272B (block 444). In an example, image registry 280 is updated with the block removal information (block 446). In the example, image registry updates the entry for node 216 to remove references to blocks 269B, 271B, and 272B (block 448).

Figure 5:
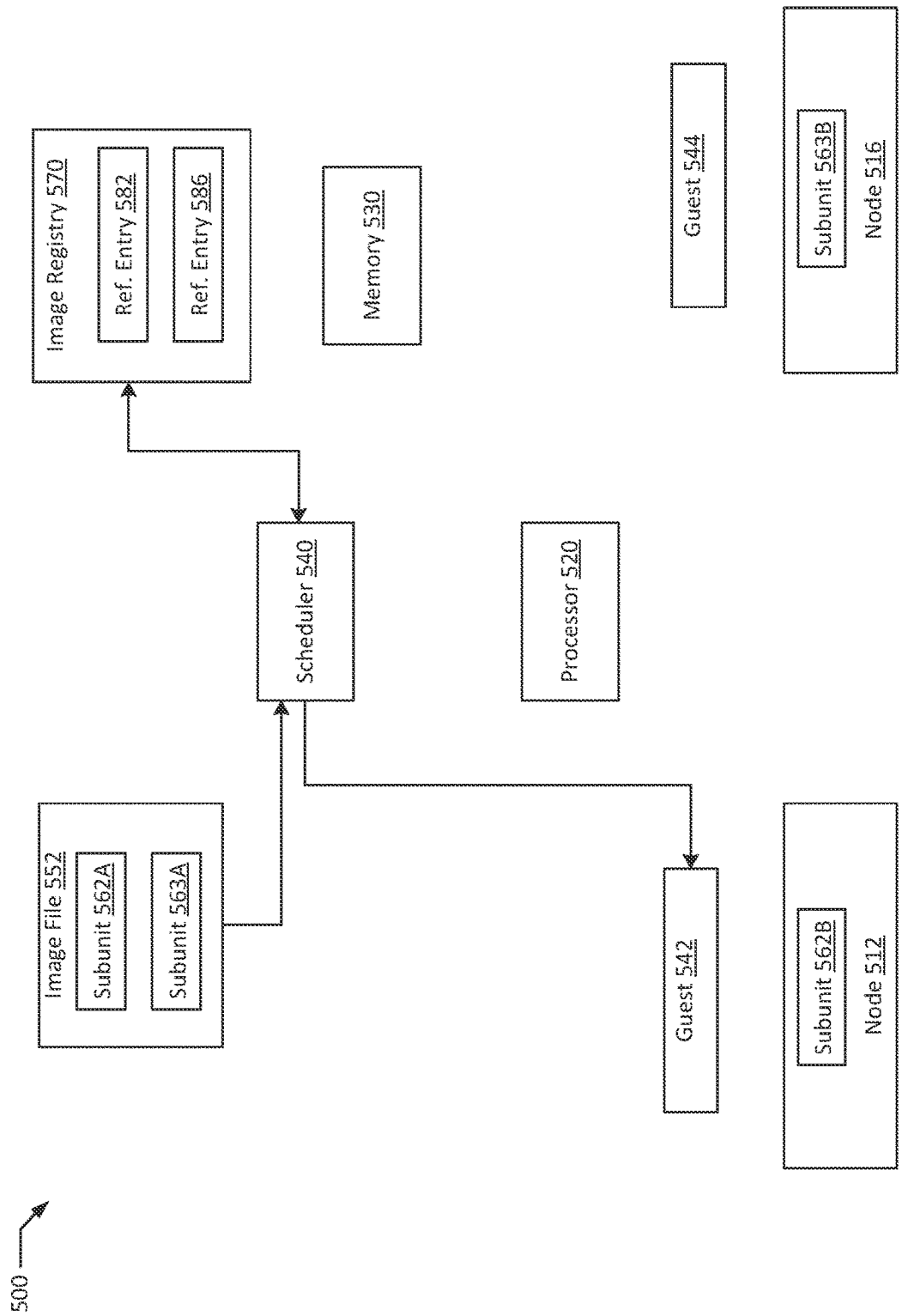
FIG. 5 is a block diagram of an example image subunit based guest scheduling system according to an example of the present disclosure.

FIG. 5 is a block diagram of an example image subunit based guest scheduling system according to an example of the present disclosure. Example system 500 includes scheduler 540 executing on processor 520, which manages deployment of guests 542 and 544 to nodes 512 and 516. Guest 542 is associated with image file 552, which includes subunits 562A and 563A. Memory 530 stores image registry 570, which stores reference entries 582 associated with subunit 562B (e.g., a copy of subunit 562A) hosted on node 512 and reference entry 586 associated with subunit 563B (e.g., a copy of subunit 563A) hosted on node 516. Image registry 570 is queried for at least one node (e.g., node 512 and/or node 516) hosting subunit 562A and/or subunit 563A. Node 512 is determined to host subunit 562B (e.g., a copy of subunit 562A). Guest 542 is scheduled to node 512 based on node 512 hosting subunit 562B.

Image subunit based guest scheduling greatly improves average guest startup times for cloud computing environments. For example, a typical scheduling heuristic based solely on caching image files and relaunching on the same nodes as previous launches is prone to being defeated by garbage collection of temporary files where latency reduction matters most. Deduplication enabled storage may allow for significant advantages in some environments where most guest deployments are duplicative. However, deduplication alone provides little latency advantages for deploying guests where previous hosts are nearing capacity or where the majority of deployments are not duplicative, while similarity analysis and image file reconstitution at a node level may enable latency reductions of 30% or more for launching new guests. At the cost of slightly more search time while a new container is scheduled, much of which may be processed in parallel to requirements based scheduling (e.g., searching for nodes with the required compute resource capacity), the typically much greater bottleneck of network bandwidth may be greatly alleviated as described herein.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
deploying guests to a plurality of nodes including first and second nodes, wherein a guest is associated with an image file, the image file includes a plurality of layers including a first layer, the first layer includes a first subunit of a first size and a second subunit of a second size, an image registry stores metadata associated with respective identifiers and sizes of each subunit hosted on each of the first and second nodes, and the image registry is executed on a third node separated from the plurality of nodes by a network;
querying the image registry for at least one node across the network hosting at least one of the first subunit or the second subunit;
determining, using identifiers of subunits, that the first node hosts the first subunit and the second node hosts the second subunit;
comparing sizes, including the first size and the second size, between the first and second nodes based on the metadata stored in the image registry; and
scheduling the guest to execute on the first node based on the first node hosting the first subunit and on the first size of the first subunit being larger than the second size of the second subunit.

2. The method of claim 1, wherein the metadata includes identifiers of each subunit of each guest hosted on each of the plurality of nodes.

3. The method of claim 1, further comprising deduplicating copies of the first subunit by providing multiple logical links to a same stored copy of the first subunit.

4. The method of claim 1, wherein the guest includes a third subunit, and the guest is scheduled to the first node based on the first node additionally hosting the third subunit.

5. The method of claim 1, wherein the guest is a container.

6. The method of claim 1, wherein the first subunit is a data block.

7. The method of claim 1, wherein a third subunit shares a same identifier with the first subunit, and a copy of the first subunit stored on the first node is loaded in place of the third subunit.

8. The method of claim 1, further comprising sending an update to the image registry identifying that copies of a plurality of blocks are now stored on the first node.

9. A system comprising:
a memory storing an image registry; and
one or more processors configured to execute to:
deploy guests to a plurality of nodes including first and second nodes, wherein a guest is associated with an image file, the image file includes a plurality of layers including a first layer, the first layer includes a first subunit of a first size and a second subunit of a second size, the image registry stores metadata associated with respective identifiers and sizes of each subunit hosted on each of the first and second nodes, and the image registry is executed on a third node separated from the plurality of nodes by a network;
query the image registry for at least one node across the network hosting at least one of the first subunit or the second subunit;
determine, using identifiers of subunits, that the first node hosts the first subunit and the second node hosts the second subunit;
compare sizes, including the first size and the second size, between the first and second nodes based on the metadata stored in the image registry; and
schedule the guest to execute on the first node based on the first node hosting the first subunit and on the first size of the first subunit being larger than the second size of the second subunit.

10. The system of claim 9, wherein the image registry stores metadata associated with each of the nodes of the plurality of nodes.

11. The system of claim 10, wherein the metadata include identifiers of each subunit of each guest hosted on each of the plurality of nodes.

12. The system of claim 9, wherein the first node deduplicates copies of the first subunit by providing multiple logical links to a same stored copy of the first subunit.

13. The system of claim 9, wherein the first subunit is a data block.

14. The system of claim 9, wherein the guest additionally includes a third subunit, and the guest is scheduled to the first node based on the first node additionally hosting the third subunit.

15. The system of claim 9, wherein an identifier for each subunit of each image file is computed and stored in the image registry.

16. The system of claim 15, wherein a third subunit shares a same identifier with the first subunit, and a copy of the first subunit stored on the first node is loaded in place of the third subunit.

17. The system of claim 9, wherein the guest logically references an existing copy of the first subunit on the first node.

18. The system of claim 9, wherein each node of the plurality of nodes is one of a virtual machine or a physical server.

19. The system of claim 9, further comprising:
an image repository storing a plurality of image files including the image file, wherein guests executing on the plurality of nodes are launched with the plurality of image files.

20. A computer-readable non-transitory storage medium storing executable instructions, which when executed by a computer system, cause the computer system to:
deploy guests to a plurality of nodes including first and second nodes, wherein a guest is associated with an image file, the image file includes a plurality of layers including a first layer, the first layer includes a first subunit of a first size and a second subunit of a second size, an image registry stores metadata associated with respective identifiers and sizes of each subunit hosted on each of the first and second nodes, and the image registry is executed on a third node separated from the plurality of nodes by a network;
query the image registry for at least one node across the network hosting at least one of the first subunit or the second subunit;
determine, using identifiers of subunits, that the first node hosts the first subunit and the second node hosts the second subunit;
compare sizes, including the first size and the second size, between the first and second nodes based on the metadata stored in the image registry; and
schedule the guest to execute on the first node based on the first node hosting the first subunit and on the first size of the first subunit being larger than the second size of the second subunit.

* * * * *